United States Patent [19]

Heinz

[11] 3,920,760
[45] Nov. 18, 1975

[54] PROCESS FOR THE PRODUCTION OF NEOPENTYL GLYCOL

[75] Inventor: James B. Heinz, Longview, Tex.

[73] Assignee: Eastman Kodak Company, Rochester, N.Y.

[22] Filed: Sept. 3, 1974

[21] Appl. No.: 502,332

[52] U.S. Cl.............. 260/635 A; 252/420; 260/602
[51] Int. Cl.².......................................... C07C 29/14
[58] Field of Search ..................... 260/635 P, 635 A

[56] References Cited
UNITED STATES PATENTS

| | | | |
|---|---|---|---|
| 2,400,724 | 5/1946 | Walker............................. | 260/635 P |
| 2,811,562 | 10/1957 | Hagemeyer...................... | 260/635 P |
| 2,895,996 | 7/1959 | Wright et al. .................... | 260/635 P |
| 3,340,312 | 9/1967 | Duke et al. ..................... | 260/635 A |

OTHER PUBLICATIONS
Hagemeyer et al., Def. Pub. of Ser. No. 66,638, filed 8/24/70, published in 892, on 11/30/71.

*Primary Examiner*—Joseph E. Evans
*Attorney, Agent, or Firm*—Edward R. Weber; Daniel B. Reece, III

[57] ABSTRACT

Production of neopentyl glycol, by a process wherein isobutyraldehyde and formaldehyde are condensed in the presence of an alkali catalyst to produce hydroxypivaldehyde which is subsequently hydrogenated to produce neopentyl glycol, is improved by the following steps which serve to reduce the sodium content in the hydrogenation reactor and thus prevent premature loss of activity of the hydrogenation catalyst. The effluent from the aldol condensation reactor is filtered to remove solid particles. This filtered stream is decanted to separate it into an organic and an aqueous stream. The organic stream is diluted with water and then passed through a filter type coalescer to further reduce the sodium content. The organic stream issuing from the coalescer will typically contain less than about 15 parts per million sodium and is suitable for further processing and hydrogenation to form neopentyl glycol. As a final step to control the sodium load in the hydrogenation reactor a portion of the hydrogenation catalyst is periodically removed. This catalyst may be washed to remove sodium and subsequently reintroduced into the hydrogenation reactor.

7 Claims, No Drawings

PROCESS FOR THE PRODUCTION OF NEOPENTYL GLYCOL

This invention relates to an improved process for the production of neopentyl glycol. More specifically this invention relates to an improved process for removing sodium salts from the hydroxypivaldehyde formed as an intermediate in the preparation of neopentyl glycol.

Neopentyl glycol (2,2-dimethylpropane-1,3-diol) is a white crystaline solid with a melting point of 130°–131°C. Neopentyl glycol is formed by the condensation of iosbutyraldehyde with formaldehyde in an aldol-type reaction to form hydroxypivaldehyde which is subsequently reduced to neopentyl glycol. One method of reducing the hydroxypivaldehyde to neopentyl glycol is hydrogenation in the presence of a Raney nickel catalyst. When neopentyl glycol is produced in this fashion, isobutyraldehyde and formaldehyde are fed, in a molar ratio of from about 1.8/1 to about 2.6/1, respectively, to an aldol condensation reactor. Sodium carbonate is dissolved in water to make a 25 percent solution by weight and is fed to the reactor to maintain 4 percent by weight sodium carbonate based on the amount of total feed. The aldol reaction system is maintained at 70°C. under atmospheric pressure. The overall contact time in the reactor averages about 60 minutes. The overflow from the reactor system passes to a decanter where it is separated into an organic stream and an aqueous stream. The organic stream is then fed to an isobutyraldehyde distillation column. Water is also fed to this column so that the water azeotrope of isobutyraldehyde can be separated from the water and hydroxypivaldehyde in the base. The water isobutyraldehyde azeotrope is decanted and the isobutyraldehyde recycled as feed to the aldol reactor. The water fed to this column is regulated to produce a bottoms stream of approximately 50 percent water and 50 percent hydroxypivaldehyde. This bottoms stream is then fed to a hydrogenation autoclave system. In this autoclave system the hydroxypivaldehyde is reduced to produce neopentyl glycol. The neopentyl glycol is removed from the autoclave as a vapor and condensed to yield a stream consisting of approximately 50 percent neopentyl glycol and water. Such a neopentyl glycol stream is suitable for purification using a system consisting of saponification, sublimation, low boiler recovery, drying, refining and flaking. Such a system is typically disclosed in U.S. Pat. No. 2,895,996 to Hagemeyer and Wright. With this type of a neopentyl glycol production system, catalyst deactivation problems are frequently encountered in the hydrogenation step. After extensive investigations, it has been discovered that the catalyst poisoning is related to the sodium compounds in the organic material fed to the autoclave system. These sodium compounds typically include sodium formate, sodium isobutyrate, sodium hydroxypivalate, sodium carbonate, sodium bicarbonate and sodium hydroxide.

In some processes which employ aldol synthesis and a subsequent hydrogenation step such as in the manufacture of 2-ethylhexanol, the hydrogenation feed is an unsaturated aldehyde which may be azeotroped overhead. Imperfections in the decantation step are corrected by simple distillation away from the sodium compounds. Another advantage of these types of processes is that a fixed bed hydrogenator may be used. In fixed bed hydrogenations a liquid drawoff is utilized rather than a vapor take-off which is the preferred method in an autoclave system operated continuously and using a slurry catalyst system. In the manufacture of neopentyl glycol the autoclave feed material, hydroxypivaldehyde, cannot be distilled overhead and cannot be hydrogenated in a fixed bed hydrogenator. Hydroxypivaldehyde cannot be distilled to the pure state without significant decomposition or yield loss through the formation of the $C_{10}$ ester, hydroxypivalyl hydroxypivalate. Also, hydroxypivaldehyde must be hydrogenated as an aqueous solution. In view of the unique characteristics of hydroxypivaldehyde the obvious route to a product which could be hydrogenated would be by extremely low pressure distillation. This is not practical for large scale commercial operations. In the presence of sodium salt residues it is questionable whether even this method would be effective.

It is therefore an object of this invention to provide a process wherein poisoning of the hydrogenation catalyst is prevented.

Another object of this invention is to provide a process whereby the sodium compounds in the effluent from the aldol reactor may be simply and economically removed from the effluent stream.

Yet another object of the invention is to provide a process which will permit continuous operation of the hydrogenation reactor.

These and other objects and advantages of this invention will become apparent from the following description and appended claims.

Investigation of the poisoning of the hydrogenation catalyst established the relationships shown in Table I. 1.

TABLE 1

| Sodium Concentration, ppm | Nickel Required, wt/vol % | Condition |
| --- | --- | --- |
| 0–1000 | 5–10 | Hydrogenation okay. |
| 1000–2000 | 10–15 | Slight decomposition and infrequent hydrogenation cessation. |
| 2000–3000 | 15–20 | Some decomposition of hydroxypivaldehyde to methanol and isobutanol; occasional hydrogenation to cessation. |
| 3000–4000 | 15–20 | Hydrogenation ceases frequently. |

As the sodium concentration increases, the poisoning effect can be compensated for by additional Raney nickel catalyst until the nickel concentration reaches approximately 25 percent by weight. Above this concentration, the nickel starts decomposing the hydroxypivaldehyde.

It was further discovered that the sodium compounds caused the organic feed material to decompose to form carbon monoxide which acts as a poison to the Raney nickel catalyst system. It has now been discovered that by a combination of steps as described below, the autoclave operation may be conducted on a continuous basis without periodic shutdown or excessive catalyst usage. This improved operation and overall improvement in the neopentyl glycol process results in a significant increase in production and yield. Maintenance and catalyst costs are also significantly reduced.

The improved process of the instant invention whereby sodium salts are removed from the aldol reactor effluent stream consists of the following steps.

Removal of solid particles in the effluent stream from the aldol reactor by filtration. This serves to enhance the subsequent decantation operation. This removal is preferably accomplished with a filter capable of removing particles of 100 microns or smaller. The purpose of the filter is to remove any extraneous solids such as river clay which is a common impurity in a sodium carbonate catalyst system. The filter also removes polymers of formaldehyde, isobutyraldehyde or hydroxypivaldehyde. Without this filtration step the solids tend to agglomerate at the decanter interface and impair the efficiency of the decantation. This results in retention of the sodium compounds in the organic layer. A normal analysis for sodium in the organic layer without the filtration step is from about 50 to about 150 ppm. With filtration the sodium can be reduced to from about 15 to about 50 ppm.

To further facilitate the decantation step the ratio of isobutyraldehyde to formaldehyde is adjusted so as to maintain a thin nonviscous organic interface layer in the decanter. This is accomplished when the isobutyraldehyde and formaldehyde molar feed ratio is maintained over about 2.2 to 1 and the aldol reactor effluent stream is not cooled below about 60°C. prior to decantation. If the molar feed ratio is below about 2.2 to 1, a heavy semiemulsified interface layer appears in the decanter which greatly hinders efficient operation of the decantation process and allows the organic layer to retain an undesirably high sodium content. The optimum feed ratio for the aldol condensation is in the range of 1.8 to 1 to 2.6 to 1 isobutyraldehyde to formaldehyde. In order to feed at the lower ratio of 1.8 to 1 and still meet the requirements of 2.2 to 1 minimum for good decantation performance, it has been discovered that 0.4 mole of isobutyraldehyde may be introduced into the aldol reactor effluent stream prior to decantation. This is preferable to operating the aldol reactor at higher mole ratios because such higher ratios result in the synthesis of significant amounts of undesirable by-products such as 2,2,4-trimethylpentanediol-1,3. Such by-products constitute a yield loss and introduce additional purification problems. Likewise if the temperature of the effluent stream is permitted to drop much below 60°C. the viscosity of the mixture becomes such that the organic/aqueous phase separation is severely hindered.

A typical analysis of the decanted organic layer when filtered and using a feed adjusted to an isobutyraldehyde and formaldehyde ratio of 2.2 to 1 is 10 percent water, 37 percent isobutyraldehyde and 53 percent hydroxypivaldehyde. This layer will contain less than 50 ppm sodium.

To further reduce the sodium content the organic layer from the decanter is mixed with fresh water in a proportion of 15 to 20 parts organic to one part water and then introduced into a filter-type coalescer. The water layer from the coalescer will remove 60 to 90 percent of the sodium compounds from the organic stream. The organic stream issuing from the coalescer will typically contain less than 15 ppm as sodium. If desired, the water layer from the coalescer can be recycled to the decanter.

In a final step to prevent excessive accumulation of sodium compounds in the hydrogenation autoclave and to facilitate long-term continuous operation of the hydrogenation step, it is desirable that a portion of the autoclave contents be periodically removed, diluted with a substantial excess of water, agitated and allowed to settle. The catalyst will settle to the bottom and may then be recycled to the autoclave. The supernatant liquid containing water, neopentyl glycol and sodium salts can be decanted and introduced into the subsequent purification process along with the neopentyl glycol effluent from the hydrogenation reactor. In a typical operation 10% of the autoclave contents will be removed once a day, diluted with 9 volumes of water per volume of contents removed, agitated and allowed to settle. The supernatant liquid containing water, neopentyl glycol and substantially all the sodium salts can then be drawn off without disturbing the settled catalyst. The settled catalyst will be substantially free of sodium salts and can be reintroduced into the hydrogenation reactor. The quantity of material withdrawn, the volume of wash water and the frequency with which this is done are matters of individual choice depending upon the size of available equipment. However, values should be selected which will maintain the concentration of sodium salts within the hydrogenation reactor at less than about 1,000 parts per million.

The process of the instant invention is illustrated in greater detail by the following examples, Example 1 being a comparative example. It will be understood, however, that these examples are not intended to limit the invention in any way and obvious modifications will appear to those skilled in the art.

EXAMPLE 1

This example describes a typical autoclave operation without the use of the filtering, coalescing and sodium removal system of the invention.

Isobutyraldehyde and formaldehyde are fed in a 2.2 to 1 ratio respectively along with a 25 percent by weight solution of sodium carbonate in water in sufficient quantity to maintain the sodium carbonate concentration at 4 percent of the total mix into a three stage aldol reactor maintained at 70°C. and atmospheric pressure under a nitrogen blanket. The level is maintained by overflowing into a decanter tank where the aqueous layer is removed and discarded. The organic layer from the decanter is fed to an isobutyraldehyde stripping column where unreacted isobutyraldehyde is removed overhead for recycle. Water is added near the base of the column so that the overflow material from the base of the column is approximately 50 percent hydroxypivaldehyde and 50 percent water. A feed rate of 60,000 pounds per day of this material is introduced into a clean 1000 gallon autoclave that has been charged with 400 pounds of Raney nickel catalyst slurried in water. The hydrogenation reaction ceases during the second day of continuous operation necessitating steam purging and additional catalyst to restart the reaction. Two hundred pounds of additional catalyst is added each time the reaction ceases until the autoclave containes 1200 pounds of catalyst (15 percent by weight). Because of the frequent stoppages the desired feed rate of 60,000 pounds per day cannot be maintained and after the third day of continuous operation the rate is reduced to 40,000 pounds per day. After the catalyst accumulates to 15 percent by weight it is necessary to discharge approximately one-sixth of the reactor contents each time the reaction ceases before 200 pounds of new catalyst can be added to restart the reaction. Generally at the end of four weeks the autoclave is entirely discharged, cleaned and the above process repeated.

The normal catalyst usage is 2000 pounds per month Raney nickel with a yield of isobutyraldehyde to neopentyl glycol of 72.41 mole percent and formaldehyde to neopentyl glycol of 78.30 mole percent with a typical two days average off steam for cleaning the autoclave each month and a daily average production rate of 20,000 pounds of refined neopentyl glycol per autoclave system. The production is approximately 300 pounds of neopentyl glycol per pound of catalyst.

EXAMPLE 2

This example demonstrates the improvement obtained in autoclave operation by the process of the invention.

To the process of Example 1 there are added filters, the coalescer, and the catalyst wash cycle. The aldol reactor feed ratio is maintained at about 2.2/1 (isobutyraldehyde/formaldehyde) and the effluent is filtered in a standard 100 micron filter prior to decantation. The organic stream from the decanter analyzes 25 ppm sodium. The stream is then mixed with pure water in a ratio of 15 to 1, respectively, and fed to a filter coalescer. The organic layer from this coalescer is fed to the isobutyraldehyde recovery column where water is also fed to dissolve the hydroxypivaldehyde. The base stream from this column is a 50 percent solution of hydroxypivaldehyde in water and contains 12.5 ppm sodium. This material is fed at the rate of 60,000 pounds per day to a clean 1000 gallon autoclave system containing 600 pounds of Raney nickel catalyst slurried in water. Once per day 100 gallons of autoclave material containing 1000 ppm sodium is removed and sent to the catalyst wash system where it is washed with 900 gallons of pure water. After thorough agitation, the mixture is allowed to settle. Nine hundred gallons of the supernatant layer is removed and combined with the NPG effluent from the autoclave. This 900 gallons removes about 0.75 pound of sodium per day. The remaining 100 gallons containing the nickel catalyst is recycled to the autoclave. By this system the hydrogenation stoppages are eliminated and the autoclave may be operated continuously.

The normal catalyst usage is 300 pounds of Raney nickel catalyst per month with a yield of isobutyraldehyde to neopentyl glycol of 81.74 mole percent and of formaldehyde to neopentyl glycol of 88.73 mole percent. There are no off stream days for cleaning the autoclave system and the daily average production rate is 30,000 pounds of refined neopentyl glycol per autoclave system. The production is approximately 3000 pounds of neopentyl glycol per pound of catalyst.

EXAMPLE 3

This example illustrates the addition of isobutyraldehyde prior to the decanter when aldol reactor feed ratios cannot be held within the desired range.

The aldol reactor is operated at a molar ratio of 1.8 to 1 isobutyraldehyde to formaldehyde, 0.4 mole of isobutyraldehyde per mole of formaldehyde is fed to the effluent from the aldol reactor to give a total equivalent molar ratio of 2.2 to 1. Analysis and flows are the same as in Example 2 with only 25 ppm sodium in the decanter organic layer and 12.5 ppm sodium in the isobutyraldehyde stripper column effluent.

The normal catalyst usage is 300 pounds per month Raney nickel with a yield of isobutyraldehyde to neopentyl glycol of 86.34 mole percent and formaldehyde to neopentyl glycol of 89.31 mole percent. There are no off stream days for cleaning the autoclave system and a daily average production rate of 32,000 pounds of refined neopentyl glycol per autoclave system is obtained. This production is approximately 3200 pounds of neopentyl glycol per pound of catalyst. The improved production as compared with Example 2 is believed to result from the fact that the aldol reaction is more efficient at the lower isobutyraldehyde/formaldehyde ratio and fewer undesired byproducts are formed.

Although the invention has been described in considerable detail with particular reference to certain preferred embodiments thereof, variations and modifications can be effected within the spirit and scope of the invention as described hereinabove and as defined in the appended claims.

I claim:

1. In a process for the production of neopentyl glycol which consists of:
    A. the aldol condensation of isobutyraldehyde with formaldehyde in the presence of a basic aldol catalyst to produce hydroxypivaldehyde;
    B. separation of the hydroxypivaldehyde containing stream from the effluent of the aldol reactor by decantation; and
    C. the subsequent hydrogenation of the hydroxypivaldehyde in the presence of a Raney nickel catalyst slurry, the improvement which comprises the following steps:
    1. filtering solid particles from the effluent from the aldol reaction;
    2. controlling the ratio of isobutyraldehyde to formaldehyde so as to maintain a thin nonviscous interface layer in the decanter by maintaining the isobutyraldehyde and formaldehyde molar ratio in the effluent stream over about 2.2 to 1 and by not cooling the effluent stream below about 60°C prior to decantation;
    3. mixing the organic stream from the decanter with water in proportions of from about 1 part water to about 15 to 20 parts of organic material;
    4. passing said water diluted organic stream through a coalescer so as to produce an organic phase and an aqueous phase;
    5. removing the organic phase from the coalescer and passing said phase into an aldehyde stripper column;
    6. removing a hydroxypivaldehyde containing stream from the bottom of the said aldehyde stripper column and introducing said hydroxypivaldehyde containing stream into the hydrogenation reactor; and
    7. recovering from the hydrogenation reactor an effluent stream containing neopentyl glycol.

2. A process according to claim 1 wherein a portion of the catalyst slurry within the hydrogenation reactor is periodically withdrawn so as to maintain the concentration of sodium in the reactor at less than about 1000 parts per million;

3. A process according to claim 2 wherein the catalyst slurry withdrawn from the reactor is diluted with an excess of water and allowed to separate into an aqueous portion containing sodium salts and a catalyst slurry substantially free of sodium salts.

4. A process according to claim 3 wherein the substantially sodium free catalyst slurry is reintroduced into the hydrogenation reactor.

5. A process according to claim 1 wherein the solid particles are removed from the effluent from the aldol reaction by a filter capable of removing particles of about 100 microns and smaller.

6. A process according to claim 1 wherein the coalescer utilized for separating the water diluted organic stream into an organic and an aqueous phase is a filter type coalescer.

7. A process according to claim 1 wherein the ratio of isobutyraldehyde to formaldehyde is attained by the addition of isobutyraldehyde to the aldol reactor effluent.

* * * * *